(12) United States Patent
Pishdadian (10) Patent No.: US 9,515,488 B2
(45) Date of Patent: Dec. 6, 2016

(54) DYNAMIC MEANS FOR CORRECTING FOR LOAD IMBALANCE AND HARMONIC DISTORTION

(71) Applicant: Hamid Pishdadian, Staten Island, NY (US)

(72) Inventor: Hamid Pishdadian, Staten Island, NY (US)

(73) Assignee: PowerMetrics International, Inc., Staten Island, NY (US)

( * ) Notice: Subject to any disclaimer, the term of this patent is extended or adjusted under 35 U.S.C. 154(b) by 0 days.

(21) Appl. No.: 14/995,461

(22) Filed: Jan. 14, 2016

(65) Prior Publication Data

US 2016/0248252 A1 Aug. 25, 2016

Related U.S. Application Data

(63) Continuation of application No. 13/763,624, filed on Feb. 9, 2013, now abandoned.

(51) Int. Cl.
| | |
|---|---|
| *H02M 5/293* | (2006.01) |
| *H05B 33/08* | (2006.01) |
| *H02J 3/26* | (2006.01) |
| *H02M 1/12* | (2006.01) |
| *H02M 1/42* | (2007.01) |
| *H02M 1/08* | (2006.01) |
| *H02J 3/28* | (2006.01) |
| *H02M 1/00* | (2006.01) |

(52) U.S. Cl.
CPC .. *H02J 3/26* (2013.01); *H02J 3/28* (2013.01); *H02M 1/08* (2013.01); *H02M 1/12* (2013.01); *H02M 1/42* (2013.01); *H02M 5/293* (2013.01); *H02M 2001/0009* (2013.01)

(58) Field of Classification Search
CPC ............... H02J 3/26; H02J 3/28; H02M 1/42; H02M 1/12; H02M 5/293; H02M 1/08; H02M 2001/0009
USPC ............................................................ 307/14
See application file for complete search history.

(56) References Cited

U.S. PATENT DOCUMENTS

| | | | | |
|---|---|---|---|---|
| 3,427,476 | A | 2/1969 | Swantner | 327/453 |
| 4,047,097 | A * | 9/1977 | Gyugyi | H02J 3/1864 323/211 |
| 5,155,430 | A * | 10/1992 | Gulczynski | H02M 3/33569 323/224 |
| 5,323,304 | A * | 6/1994 | Woodworth | H02M 1/12 307/105 |

(Continued)

OTHER PUBLICATIONS

International Search Report and Opinion May 20, 2014.

*Primary Examiner* — Jared Fureman
*Assistant Examiner* — Michael Warmflash
(74) *Attorney, Agent, or Firm* — Clifford Kraft (57) ABSTRACT

A method and apparatus are directed to a dynamic means for correcting imbalance and harmonic distortion in an electrical system. In one embodiment, the device includes an imbalance and harmonics measurement module configured to measure power parameters for determining imbalance and harmonics within the electrical three-phase system. Within this system a series of capacitors are configured to respond to measured demands reported and designated to correct for imbalance and harmonics distortion. The device is networked among various source load controllers are responsible for designating master and slave relationships within the closed system.

10 Claims, 8 Drawing Sheets

(56) References Cited

U.S. PATENT DOCUMENTS

| | | | | |
|---|---|---|---|---|
| 5,570,006 | A * | 10/1996 | Woodworth | H02M 1/12 323/208 |
| 5,912,549 | A * | 6/1999 | Farrington | H02M 1/4225 323/207 |
| 6,687,627 | B1 * | 2/2004 | Gunn | G01R 21/133 324/500 |
| 7,586,718 | B1 * | 9/2009 | Radosavljevic | H01H 83/04 361/42 |
| 8,076,920 | B1 * | 12/2011 | Melanson | H02M 1/4208 315/247 |
| 9,385,605 | B2 * | 7/2016 | Wilson | H02M 3/1582 |
| 2004/0051513 | A1 | 3/2004 | Rupp et al. | |
| 2005/0207197 | A1 * | 9/2005 | Chou | H02M 1/12 363/131 |
| 2006/0103365 | A1 | 5/2006 | Ben-Yaacov | 323/313 |
| 2008/0197819 | A1 * | 8/2008 | Thompson | G05F 1/613 323/223 |
| 2009/0195164 | A1 | 8/2009 | Joseph | |
| 2010/0079125 | A1 | 4/2010 | Melanson et al. | 323/285 |
| 2010/0118571 | A1 | 5/2010 | Saint-Pierre | 363/89 |
| 2010/0208501 | A1 * | 8/2010 | Matan | H02J 3/18 363/95 |
| 2011/0157942 | A1 | 6/2011 | Babcock et al. | 363/126 |
| 2012/0051105 | A1 | 3/2012 | Mednik et al. | |
| 2012/0326679 | A1 * | 12/2012 | Lau | H02J 3/26 323/208 |

* cited by examiner

DYNAMIC MEANS FOR CORRECTING FOR LOAD IMBALANCE AND HARMONIC DISTORTION

This is a continuation of application Ser. No. 13/763,624 filed Feb. 9, 2013. Application Ser. No. 13/763,624 is hereby incorporated by reference in its entirety.

FIELD OF INVENTION

This invention relates to switching circuits. More specifically, effectively switching on and off a capacitor or capacitor bank within a closed system in response to measured load imbalance and harmonic distortion that utilizes master slave relationships with a closed electronic system. This invention is applicable to arc welding, magnetizing materials, and switching capacitors no list only three applications via a novel means.

BACKGROUND

In a typical power line capacitor switching system application, electrical parameters of the power drawn is measured using integrated circuits, the parameter also indicating the reactive power by a load and then communicating via a switching device to a capacitor bank which thereby attempts to match the load of a power line at an designated signal value or by calculated measured factor ratio. Traditionally electronic switches attempt to switch high-energy loads at the voltage zero point crossing meaning where the line voltage crosses through the neutral line wherein the voltage equals zero. The state of the art today and for the past several decades has been to use switch circuits that require a certain amount of current to bias their base and this current is typically induce by the line voltage. Consequently, it is impossible to turn the switch on exactly at the zero crossing of the line voltage.

Currently, there are no effective means or methods for correcting for imbalance or harmonic distortion within industrial and commercial settings. The current state of the art calculates a signal value of reactive power drawn by the load or calculated from a ratio of an active power value and converted to presumed power value. Under these two methods there is a problem to overcome. In the case of a 208, 3 phase AC line, the peak voltage of the line will be approximately 300 volts. The minimum voltage of the line will be approximately 300 volts and any voltage undischarged from the capacitor will be added to the line voltage and consequently the switching voltage will be as much as two times that of the line voltage. Under these applications both switches and capacitors are damaged and frequent replacements are the common practice. Currently there are no high energy power line capacitor switching systems that match the voltage of the capacitor to the line voltage at the time the switch contact is made, how the capacitor can be discharged rapidly so that it can to switched on rapidly, or that guarantees that the capacitor is kept in its discharge mode in the event of a power loss.

The ever-increasing demand for electrical energy has triggered a search for greater efforts to attain higher efficiency in every aspect of this industry. The costs for generating as well as for electricity have risen as demand has increased. Many efforts to increase efficiency, reduce consumption, and mitigate delivery costs have been developed and implemented to this end.

Most importantly, the state of the current art is focused on addressing power factor correction or in common parlance, reducing KVAR. Our invention is focused on correcting for load imbalance and harmonic distortion commonly known as KW.

Thus there is a need in the art for a novel, dynamic capacitor switching system to correct for load imbalance and harmonic distortion.

The present invention describes a novel and dramatically more efficient point to locate and implement the switching circuit. This current invention teaches that the optimum timing of the switching circuit is in the second quadrant of the Alternate Power line circle.

SUMMARY OF THE INVENTION

The present invention provides a novel means for measuring the negative energy within a closed AC electronic system that will correct for load imbalance and harmonic distortion. As part of this novel means the system itself can designate master slave relationships within the closed system to facilitate the safe transfer of energy from a source to a load while overcoming the deficiencies of conventional circuit protection and correction devices.

The present embodiments provide, among other features and benefits, significant advances in the control of power conversion, obtaining high power factor at low loads. A brief summary of various illustrative example embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to methods of controlling power delivered from the main source to a load by an imbalance correcting system which utilizes a novel switch that enables a system previously not achievable to address KW meaning both load imbalance and harmonic distortion. The load imbalance correcting system receives an alternating-current (AC) voltage as an input, wherein the mains AC voltage has an absolute voltage value varying in a cyclic manner from a zero to a zero over a cycle period. The switch unique to this system locates point between 90 degrees and 180 degrees (second quadrant) of the voltage and current AC waveform and syncs the voltage and the current as both cross the zero point.

Among features and benefits provided by the various embodiments, this ability to synchronize the zero crossing of the voltage and the current in the second quadrant of the AC waveform the current delivery to the load provides substantially improved imbalance correction of AC voltage.

Thus, the scope of the disclosed invention should be determined by the appended claims and their legal equivalents, rather than the examples given.

BRIEF DESCRIPTION OF THE DRAWINGS

The present invention may be more fully understood by one of skill in the art with references being had to the following detailed description of several preferred embodiments, taken in conjunction with the accompanying drawings wherein like elements are designated by identical reference numbers throughout several views and in which.

DETAILED DESCRIPTION

Figure 1:
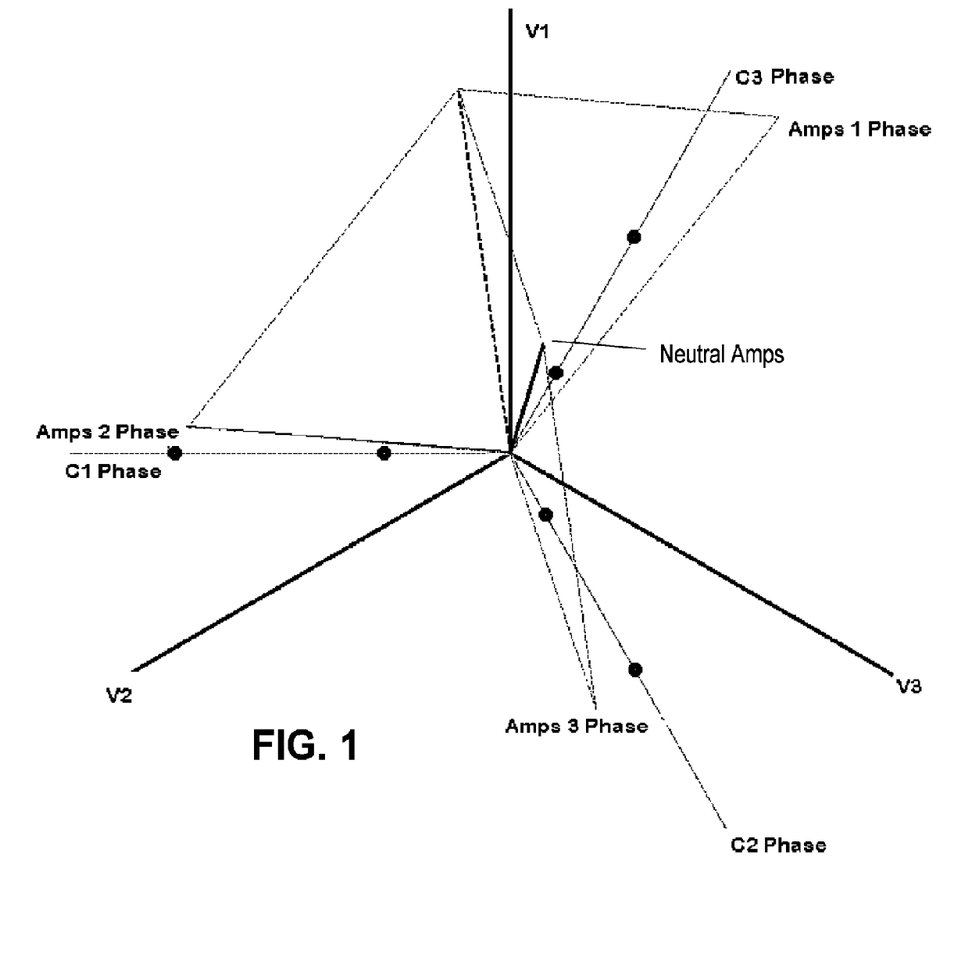
FIG. 1 is a graphical representation illustrating a typical phase 3 system.

FIG. 1 is a graphical depiction, which shows a phase diagram of the statures of the panel before any correction is made by implementing the current invention. This figure specifically shows the relative phase relationship between all voltages and currents in a typical phase 3 system. The solid red line represents imbalance current in neutral line. It is produced by vector sum of all currents involved. The red dots of capacitor phase lines indicate the maximum and minimum amount of capacitance that is allowed for the panel. These limits will assure the stability of the system so it does not create harmonics and will produce minimum acceptable phase correction.

Figure 2:
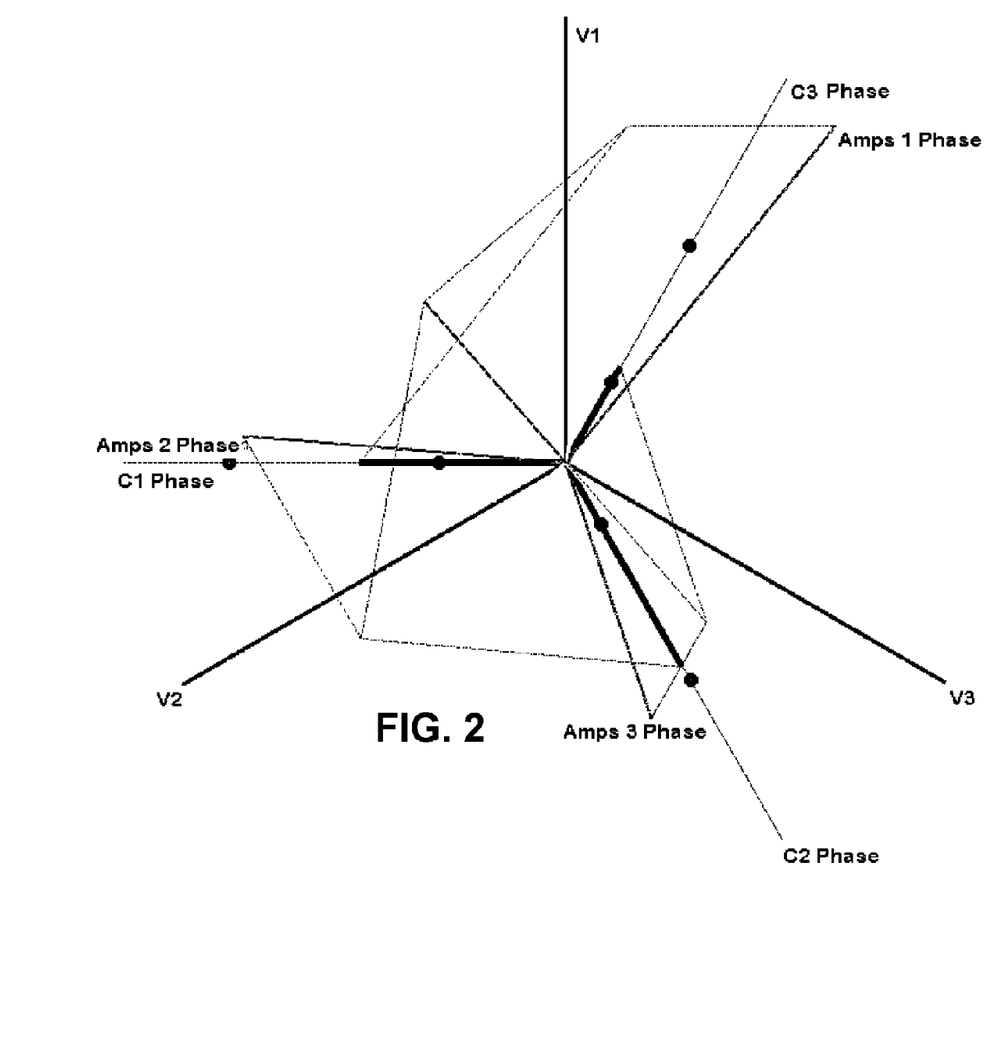
FIG. 2 is a graphical representation illustrating a phase 3 system implementing the current invention.

FIG. 2 is a graphical depiction, which shows the correction achieved by implementing the current invention. The thick purple lines indicate the amount of capacitance applied to each phase. The red line indicating the neutral current in FIG. 1 has disappeared indicating there is no more current being wasted in neutral line. The lack of current in the neutral line indicates that the system has been balanced.

Figure 3A:
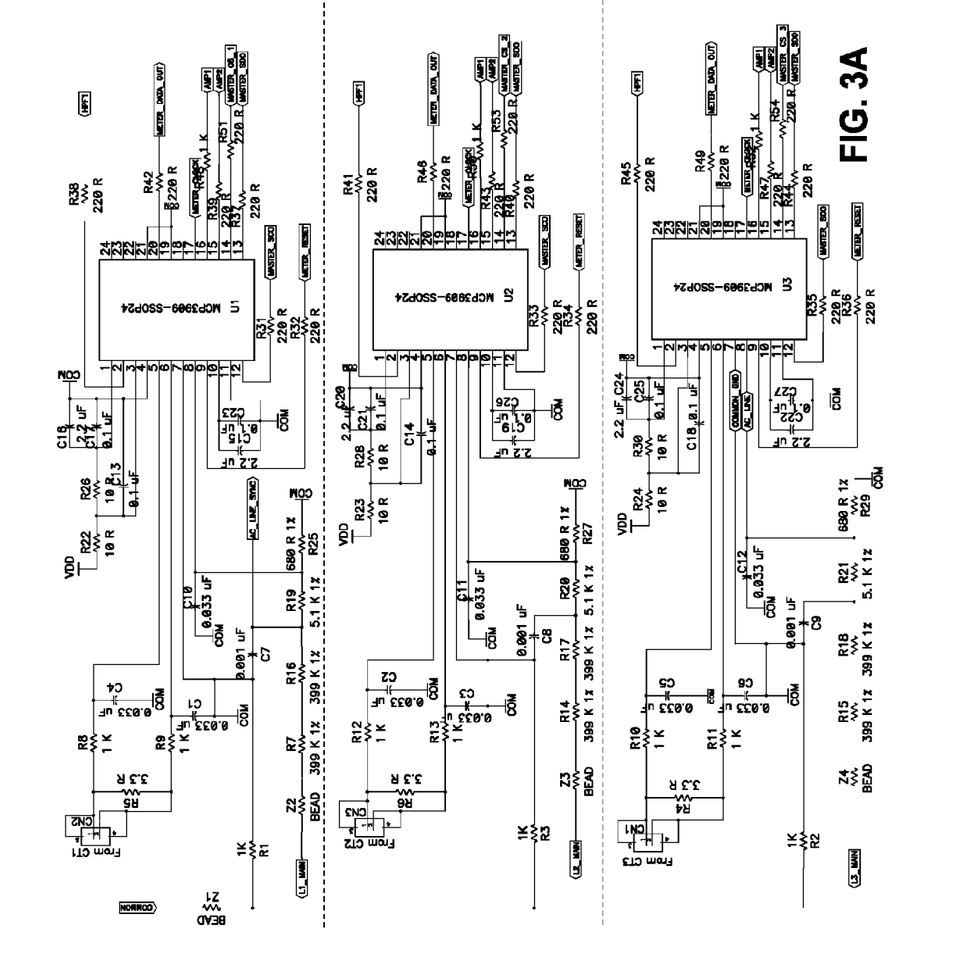
FIG. 3a is a schematic diagram of an exemplary control circuitry in an imbalance factor corrector.

FIG. 3a Shows a schematic diagram of the Main Board. A current from VDD 1 passes through resistor R22. Some of the current passing through resistor R22 passes through resistor R26 and to capacitor C13. Capacitor are also referred to as output means and switching power means. Capacitor C13 and resistor R26 are connected in parallel to one another. The current passing through resistor 26 passes into capacitor C16 and capacitor C17 respectively. Some of the current passing through capacitor C16 passes onto COM. Some of the current passing through capacitor C16 and capacitor C17 passes to processor U1 via NC4. Input from HPF1 pass through resistor R38 to processor U2 via HPF2. Processor U1 send an output current from Dgnd 21 and NC19 to COM. Processor U1 sends an output current from NEG-SDO 20 through resistor R42 to Meter_Data_Out. Processor U1 receives a current from Meter Clock at OSCI 17. A current passes from AMP1 passing through resistor R48 and is received by the Processor U1 via G0 16. Processor is also referred to a controller in the specification as well as the Claims. A current passes from AMP2 passing through resistor R39 and is received by the Processor U1 via G1 15. A current passes from Master_CS$_{-1}$ passing through resistor R51 and is received by the Processor U2 via F0-/CS 14. A current passes from Master_SOO passing through resistor R37 and is received by the Processor U1 via F1-SDI 13. A current passes from Master_SCO passing through resistor R31 and is received by the Processor U1 via F2-SCK 12. A current passes from Meter_Reset passing through resistor R32 and is received by the Processor U1 via /MCLR 9. A current leaves processor U1 via Agnd 11 and passes through capacitors C23, COM, and capacitor C15 respectively. Some of the current passing through capacitors C23 and C15 are received by processor U1 via Ref_in/out 10. A current passes from L1 Main through resistor Z2, resistor R7, resistor R16 resistor R19 and resistor R25 respectively Current passing through resistor Z2, resistor R7, resistor R16 resistor R19 and resistor R25 passes into COM. Resistor Z2, resistor R7, resistor R16 resistor R19 and resistor R25 are connected in series. The current passing through resistor R16 passes into capacitor C7. The current passing through Capacitor C7 passes into capacitor C1, to Com, and to processor U1 at CH1 7, respectively. Some current passing through resistor R16 and resistor R19 passes to AC_Line_Sync. A current from Common passes through Bead 21, resistor R1, resistor R3, and resistor R2, respectively. A current from L2_Main passes through Bead Z3, resistor R7, Resistor R16. Some of the current passing through resistor R16 passes to resistor 19, to capacitor C7, and to AC_Line_Sync, respectively. A current from common passed through bead Z1. Some of the current passing through Bead Z1 passes to resistor R1, resistor R3 and resistor R2 respectively. The current passing through resistor R1 passes to capacitor C1, COM, and to CH1 7. Some current passing through resistor R20 passes to capacitor C10 and AC_Line_PH1. The current passing through AC_Line_PH2 passes to processor U1 via CH1+8. The current passing through capacitor C11 passes to COM. Some current passing through capacitor C1 passes to capacitor C7. Some current passing through capacitor C7 passes to processor U1 at CH1-7. Some current passing through capacitor C7 and the current passing through resistor R1 from Common pass into capacitor C1. Some of the current that passes through capacitor C1 passes through resistor R9 and into processor U1 at CH0-6, respectively. The current passing through resistor R9 passes through resistor R5 and CN2 4. A current from CT1 passes through resistor R8 and through resistor R5, respectively. The current passing through resistor R8 passes into capacitor C4 and some current passes to processor U1 via Cho+5. The current passing through capacitor C4 passes to COM. The current passing from Common passes through resistor R3 into capacitor C8. The current passing through capacitor C8 passes through resistor R20. A current from VDD 2 passes through resistor R23. Some of the current passing through resistor R23 passes through resistor R28 and to capacitor C14. Capacitor C14 and resistor R28 are connected in parallel to one another. The current passing through resistor 28 passes into capacitor C21, capacitor C20, and to processor U2 via Dvdd 1, respectively. Some of the current passing through resistor R28 and capacitor C20 passes onto COM. Some of the current passing through resistor R23 and capacitor C14 passes to processor U2 via NC 4. Input from HPF 2 pass through resistor R41 to processor U2 via HPF1. Processor U2 send an output current from Dgnd 21 and NC19 to COM respectively. Processor U2 sends an output current from NEG-SDO 20 through resistor R46 to Meter_Data_Out. Processor U2 receives a current from Meter Clock at OSCI 17. A current passes from AMP1 passing through resistor R50 and is received by the Processor U2 via G0 16. A current passes from AMP2 passing through resistor R46 and is received by the Processor U2 via G1 15. A current passes from Master_CS$_{-2}$ passing through resistor R53 and is received by the Processor U2 via F0-/CS 14. A current passes from Master_SOO passing through resistor R40 and is received by the Processor U2 via F1-SDI 13. A current passes from Master_SCO passing through resistor R33 and is received by the Processor U2 via F2-SCK 12. A current passes from Meter_Reset passing through resistor R34 and is received by the Processor U2 via /MCLR 9. A current leaves processor U2 via Agnd 11 and passes through capacitors C26, COM, and capacitor C19 respectively. Some of the current passing through capacitors C26 and C19 are received by processor U2 via Ref_in/out 10. A current passes from L2 Main through resistor Z4, resistor R14, and resistor R17. Some of the current passing through resistor R17 passes through capacitor C8 and resistor R20 respectively. The current passing through capacitor C8 passes through resistor R3. The current passing through resistor R3 passes to processor U2 via Ch1–7. Some of the current passing through resistor R20 passes to capacitor C11, to resistor R20, and to processor U2 via AC_Line_PH2, respectively. The current passing through Capacitor C11 passes to COM. Current from processor U2 from CHO–6 passes to capacitor C3 and to resistor R13 respectively. The current passing through resistor R13 passes though resistor R6. The current passing through resistor R6 passes through resistor R12 then to capacitor C2 and the processor via CHO–5. The current passing through capacitor C2 passes to COM. Some current passing through resistor R12 passes to CN3 1 and 3. Current passing through resistor R6 enter CN3 via pin 4. A current from VDD 3 passes through resistor R24. Some of the current passing through resistor R24 passes through resistor R30 and to capacitor C18. Capacitor C18 and resistor R30 are connected in parallel to one another. The current passing through resistor 30 passes into capacitor C25, capacitor C24, and to processor U3 via Dvdd 1, respectively. Some of the current passing through resistor R30 and capacitor C24 passes onto COM. Some of the current passing through resistor R24 and capacitor C18 passes to processor U2 via NC 4. Input from HPF 2 pass through resistor R45 to processor U2 via HPF1. Processor U3 send an output current from Dgnd 21 and NC19 to COM respectively. Processor U3 sends an output current from NEG-SDO 20 through resistor R49 to Meter_Data_Out. Processor U3 receives a current from Meter Clock at OSCI 17. A current passes from AMP1 passing through resistor R52 and is received by the Processor U2 via G0 16. A current passes from AMP2 passing through resistor R47 and is received by the Processor U3 via G1 15. A current passes from Master_CS_-3 passing through resistor R54 and is received by the Processor U3 via F0-/CS 14. A current passes from Master_SOO passing through resistor R44 and is received by the Processor U3 via F1-SDI 13. A current passes from Master_SCO passing through resistor R35 and is received by the Processor U3 via F2-SCK 12. A current passes from Meter_Reset passing through resistor R36 and is received by the Processor U3 via /MCLR 9. A current leaves processor U3 via Agnd 11 and passes through capacitors C22, COM, and capacitor C27 respectively. Some of the current passing through capacitors C22 and C27 are received by processor U3 via Ref_in/out 10. A current passes from L3 Main through resistor Z4, resistor R15, and resistor R18. Some of the current passing through resistor R 18 passes through capacitor 19 and resistor R21 respectively. Some of the current passing through resistor R21 passes to capacitor C12, to resistor R29, and to processor U2 via AC_Line_PH3, respectively. The current passing through resistor R29 passes to COM. Some of the current passing through capacitor C9 passes to resistor R2, capacitor C6 and to processor U3 via Common_GND, respectively. Current passing through capacitor C6 passes to COM, resistor R11 and to processor U3 respectively. Some current passing through resistor R11 passes to resistor R4 and to CN1 at pins 2 and 4 respectively. Some current passing through resistor R4 passes to resistor R19 and to CN1 at pins 1 and 3. The current passing through resistor R10 passes into capacitor C5 and the processor via CHO+5.

Figure 3B:
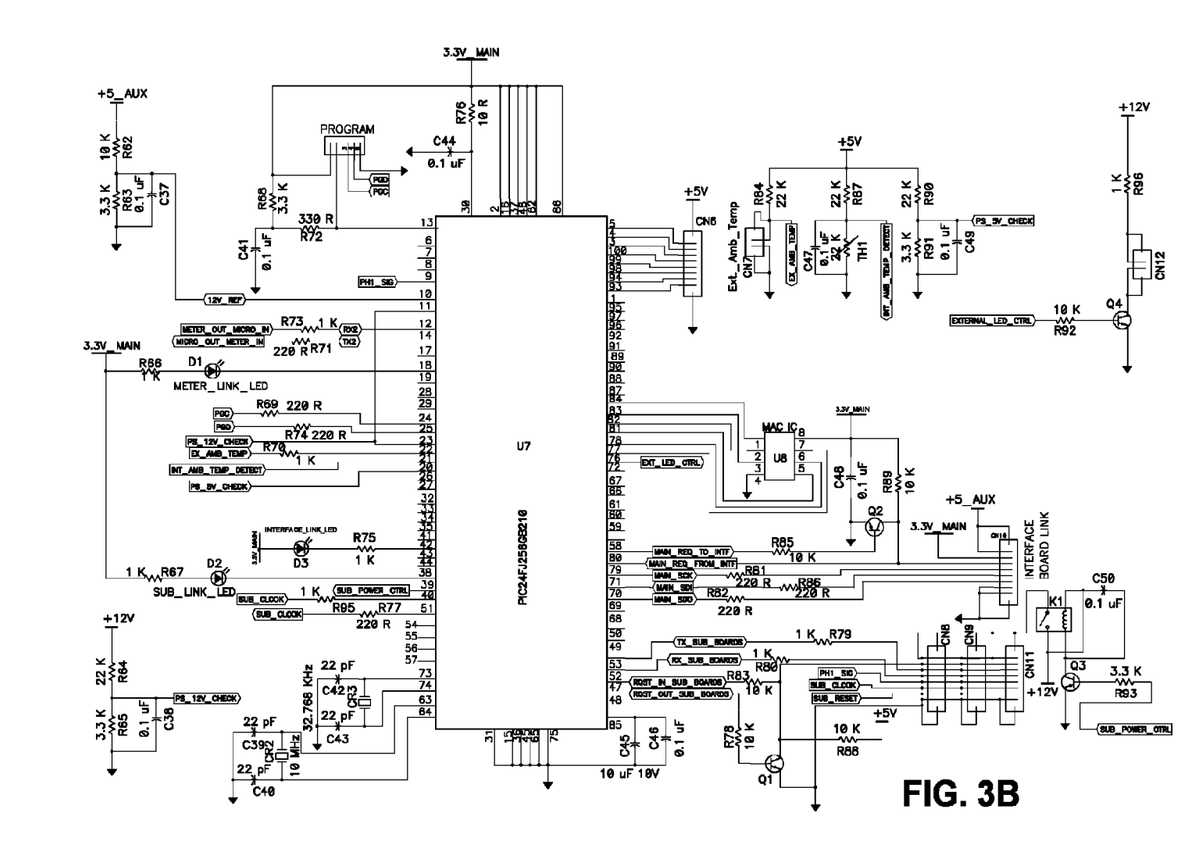
FIG. 3b is a schematic diagram of an exemplary control circuitry in an imbalance factor corrector.

FIG. 3b Shows a schematic diagram of the Main Board. A current from 3.3V_Aux and from CN4 pin 1 passes through resistor R55 to capacitor C28 and through resistor R56. Some of the current passing through resistor R56 passes to CN4 via pin 2 and to processor U4 via MCLR 18. The current passing through capacitor C28 to COM. A current from processor U4 from AVDD 17, VDD 40, VDD 28, pass through resistor R57 and capacitor C31, capacitor C32, capacitor C35 and capacitor C36 respectively. A current from processor U4 via VCAP 7 to capacitor C30. The current passing through capacitor C30, capacitor C31, capacitor C32, capacitor C35, and capacitor C36 flow to COM. The current passing through resistor R57 passes to capacitor C29. Some of the current passing through capacitor C29 passes to CN4 pin 5 and to COM. CN4 receives a signal at pin 3 from processor U4 from pin 21 Meter_PGC. A signal from processor U4 from pin 22 Meter_PGD is received at CN4 at pin 4. Some of the current from AC_LINE_SYNC passed through resistor R97 and enters processor U4 via pin 24 AN5/Cin+/RP3/CN7/RB3 and to capacitor C51 respectively. A current from COMP_FB passes through resistor R98 and passes to capacitor C51 and to processor U4 at pin 24 AN %/C1in+/RP3/CN7/RB3. The current passing through capcitor C51 passes to COM. A signal from Meter_Clock passes to processor U4 at SCL1/RP8/CN22/PMD4/RB8 at 44. A signal from Meter_RESET passes to processor U4 at DA1/RP9/CN21/PMD3/RB9 at pin 1. A signal from Master_CS_-1 passes to processor U4 at PGED2/EMCD2/RP10/CN16/PMD2/RB10 at pin 8. A signal from Master_CS_-2 passes to processor U4 at PGEC2/RP11/CN15/PMD1/RB11 at pin 9. A signal from Master_CS_-3 passes to processor U4 at AN12/RP12/CN14/PMD0/RB12 at pin 10. A signal from HPF1 passes to processor U4 at AN11/RP13/CN13/PMRD/RB13 at pin 11. A signal from AMP1 passes to processor U4 at AN10/RP14/CN12/PMWR/RB14 at pin 14. A signal from AMP2 passes to processor U4 at AN9/RP15/CN11/PMCS/RB15 at pin 15. A signal from Meter_DATA_OUT passes to processor U4 at Interface Board. RP22/CN18/PMA1/RC6 at pin 2. A signal from Master_SCO passes to processor U4 at interface board. RP23/CN17/PMA0/RC7 at pin 3. A signal from Master_SOO passes to processor U4 at RP24/CN20/PMA50/RC8 at pin 4. A current passes from processor U4 from AVSS at pin 16, VSS at pin 6, VSS at pin 29 and VSS pin 39 to COM. Processor U4 sends a signal via SOSCO/T1CK/CN0/RA4 at pin 34 to interface board. Processor U4 sends a signal via SOSCI/RP4/CN1/RB 4 at pin 35 to interface board. Processor U4 sends a signal via OSC1/CLK1/CN30/RA 2 at pin 30 to capacitor C34 and CR1 respectively. The current passing through capacitor C34 passes to COM. Processor U4 sends a signal via OSC2/CLK0/CN29/RA 3 at pin 31 to capacitor C33 and CR1 respectively. The current passing through capacitor C34 passes to COM. Processor U4 sends a signal via TCK/PMA7/RA 7 at pin 13 to interface board. Processor U4 sends a signal via TD0/PMA8/RA 8 at pin 32 to interface board. Processor U4 sends a signal via TD1/PMA9/RA 9 at pin 35 to interface board. Processor U4 sends a signal via TMS/PMA10/RA 10 at pin 12 to interface board. Processor U4 sends a signal via RP19/CN28/PMBE/RC3 at pin 36 to COMP_Fb and to resistor R60 respectively. The current passing through resistor R60 passes to optoisolator U6. Optoisolator also means opto coupler and in the claims is referred to as sensing means. Current passing through optoisolator U6 passes to COM and to resistor R61. A current passing through 3.3V_Main passes into optoisloater and passing through optoisolator U6 passes through resistor R61 and to processor U4 via PH1_S1G. Processor U4 sends a signal via RP20/CN25/PMA4/RC4 at pin 37 to resistor R59. The current passing through resistor R59 passes to Inductive coupler U5 at pin 3. An induced current from the current passing via pin 3 sends a current to Meter_OUT_Micro. Processor U4 receives an induced current from Inductive coupler U5 via RP21/CN26/PMA3/RC5 at pin 38 as the induced current passes through resistor R58. The induced current passes into inductive coupler U5 from Micro_OUT_Meter. Processor U4 sends a signal via PGED3/ASDA1/RP5/CN27/PMD7/RB5 at pin 41 to interface board. Processor U4 sends a signal via PGEC3/ASCL1/RP6/CN24/PMD6/RB6 at pin 42 to interface board. Processor U4 sends a signal via INT0/RP7/CN23/PMD5/RB7 at pin 43 to interface board.

A current from 3.3V Main passes through resistor R76, resistor R68, and Program at pin 1, respectively. Current passes from processor U7 from VDD pin 2, VDD 16, VDD 37, VDD 46, VDD 52 and passes through resistor R68, EN VREG 86 and to Program at pin 2. Some of the current passing through resistor R68 passes to capacitor C41 and also to resistor R72 respectively. Some of the current passing through resistor R72 passes to Program at pin 2 and to processor U7 via MCLR at 13. Some of the current that passes through resistor R76 passes to capacitor C44 and to processor 47 via Avdd pin 30. Processor U7 receives a current signal via INT0/RP7/CN23/PMD5/RB7 at pin 43 to interface board. A current passes from processor RPI38/RC1 at 6 and passes to interface board. A current passes from processor RPI39/RC2 at 7 and passes to interface board. A current passes from processor RP40/RC3 at 6 and passes to interface board. A current is received by processor U7 from PH1_SIC at RP141/RC4 at 9. A current passes from +5_AUX through resistor R62 and. The current passing through resistor R62 then passes through resistor R63, capacitor C37 and along line 12V_Ref to processor U7 via C1ND/RP21/RG6 at pin 10. A current from Meter_OUT_Micro_IN passes through R73 along line RX2 to processor U7 at C2IND/RP19/RG8 at pin 12. A current from MOR_OUT_Micro_IN passes through R71 along line TX2 to processor U7 at C2INC/RP27/RG9 at pin 14. A current from 3.3V_Main passes through resistor R66 and resistor R67, respectively. Current passing through resistor R66 passes to diode D1along line METER_LINK_LED to processor U7 at RP133/RE8 18. Current passing through resistor 67 passes through diode D2 along line SUB_LINK_LED to processor U7 at TCK/RA1 at pin 38. A current from 3.3V_MAIN passes through diode D3 along line INTERFACE_LINK_LED to resistor R75. The current passing through resistor R75 passes to processor U7 at AN13/CTEDG1/RB13 at pin 42. Processor U7 receives a current passing through resistor R69 passing along line/from PGC at PGEC1/AN1/RP1/RB1 at pin 24. Processor U7 receives a current passing through resistor R74. Some of the current passing through resistor R74 passes along line/from PCD at PGED1/AN0/RP0/RB0 pin 25 and to processor U7 at pin 11 C1NC/RP26/RG7. Processor U7 receives a current passing along line from PS_12V_CHECK at AN2/RP13/RB2 at pin 23. Processor U7 receives a current passing through resistor R70 passes along line/from EX_AMP_TEMP_DETECT at AN4/RB3 at 22. Processor U7 receives a current passes along line/from INT_AMP_TEMP_DETECT at AN4/RB3 at 21. Processor U7 receives a current passing along line/from PS_5V_CHECK at AN5/RP18/Rb5 at 20. Processor U7 receives a current passing along line/from TMS/RA0 at pin 17. Processor U7 receives a current passing along line/from RP134/RE9 at pin 19. Processor U7 receives a current passing along line/from Vref−/RA9 at pin 28. Processor U7 receives a current passing along line/from Vref−/RA10 at pin 29. Processor U7 receives a current passing along line/from PGEC2/AN6/RP6/RB6 at pin 26. Processor U7 receives a current passing along line/from PGED2/AN7/RP7 at pin 27. Processor U7 receives a current passing along line/from AN8/RP8/RB8 at pin 32. Processor U7 receives a current passing along line/from AN10/CVREF/RB10 at pin 34. Processor U7 receives a current passing along line/from AN9/RP9/RB9 at pin 33. Processor U7 receives a current passing along line/from AN11/RB11 at pin 35. Processor U7 receives a current passing along line/from AN12/CTEDG2/RB12 at pin 41. Processor U7 receives a current passing along line/from AN14/CTPLS/RP14/RB14 at pin 43. Processor U7 receives a current passing along line/from AN15/REF0/RP29/RB15 at pin 44. Processor U7 receives a current passing along line/SUB_POWER_CTRL from RP31/RF13 at pin 39. A current passes from RP132/RF12 pin 40 of Processor U7 through resistor R95 along line SUB_CLOCK. A current passes from RP16USB10/RF3 pin 51 of Processor U7 through resistor R77 along line SUB_CLOCK. Processor U7 receives a current passing along line/from VBUS/RF7 at pin 54. Processor U7 receives a current passing along line/from VUSB at pin 55. Processor U7 receives a current passing along line/from D−/RG3 at pin 56. Processor U7 receives a current passing along line/from D+/RG2 at pin 57. A current passes from U7 via SOS/RC13 pin 73 to capacitor C42 and crystal CR3. A current passes from U7 via SOSCO/RP137/RC14 pin 74 to capacitor C43 and crystal CR3, respectively. A current passes from U7 via OSC1/CLKIN/RC12 pin 63 to capacitor C39 and crystal CR2, respectively. A current passes from U7 via OSC2/CLK0/RC15 pin 64 to capacitor C39 and crystal CR2, respectively. A current passes from Processor U7 at AVSS pin 31, VSS pin 15, VSS pin 36, VSS pin 45, VSS pin 65, VSS pin 75 and VCAP at pin 85, respectively. Some of the current passes from VCAP pin 85 passes to capacitor C46 and to capacitor C45 respectively. A current from +5V passes into CN6 at pin 10. Current passes from CN1 pin 9 to processor U7 via SDA3/RE7 at pin 5. Current passes from CN1 pin 8 to processor U7 via SCL3/RE6 at pin 4. Current passes from CN1 pin 7 to processor U7 via RE6 at pin 3. Current passes from CN6 pin 6 to processor U7 via RE4 at pin 100. Current passes from CN6 pin 5 to processor U7 via RE3 at pin 99. Current passes from CN6 pin 4 to processor U7 via RE2 at pin 98. Current passes from CN6 pin 3 to processor U7 via RE1 at pin 94. Current passes from CN6 pin 2 to processor U7 via RE0 at pin 93. A current passes from U7 via RG15 pin 1 to interface board. A current passes from U7 via RG14 pin 95 to interface board. A current passes from U7 via RG12 pin 96 to interface board. A current passes from U7 via AN22/RA7 pin 92 to interface board. A current passes from U7 via AN23/RA6 pin 91 to interface board. A current passes from U7 via RG1 pin 89 to interface board. A current passes from U7 via RG0 pin 90 to interface board. A current passes from U7 via VCMPST2/SESSVLD/RF1 pin 88 to interface board. A current passes from U7 via VBUSSTVBUSVLD/RF1 pin 87 to interface board. A current passes from U7 via C3INA/RD7 pin 84 to MAC IC U8 CE pin 1. A current passes from U7 via C3INB/RD6 pin 83 to MAC IC U8 WP pin 3. A current passes from U7 via RP20/RD5 pin 82 to MAC IC U8 SO pin 2. A current passes from U7 via RP25/RD4 pin 81 to MAC IC U8 SI pin 5. A current passes from U7 via RP22/RD3 pin 78 to MAC IC U8 SCK pin 6. A current passes from U7 via DPH/RP23/RD2 pin 77 to MAC IC U8 HOLD pin 7. Some current passing from MAC IC U8 VDD pin 8 to capacitor C48 and through resistor R89, respectively. Some current from 3.3V_Main passes to capacitor C48 and resistor R89, respectively. Some current passes through resistor R89 to NPN transistor Q2. Some of the current passing through NPN transistor Q2 passes through resistor R85 and to CN10 pin 3. CN10 links to interface board. The current passing through resistor R85 communicates with processor U7 via line MAIN_REO_TO_INTF to RD13 pin 80. Processor U7 pin 79 communicates to CN10 U8 via line MAIN_REO_F-ROM_INTF at pin 3. A current from CN10 pin 4 passes through resistor R81 along line MAIN_SCK. The current passing from CN10 pin 4 passes through resistor R81 passes to processor U7 via RP12/RD11 at pin 71. The current passing from CN10 via pin 5 passes through resistor R86 via line MAIN_SD1 and passes to processor U7 via RP3/RD10 at pin 70. CN10 from pin 5 communicates to processor U7 via line MAIN_SD0. Current from CN10 passes through resistor R82 to U7 DPLN/RP4/RD9 pin 69. A current passes from U7 via DLMN/RTCC/RP2/RD8 pin 50 to interface board. A current passes from U7 via RP17/RF5 pin 50 to interface board. A current passes from U7 via RP10/RF4 pin 49 to interface board. Current from a +12V power source passes to relay safety switch K1. When relay safety switch is closed the current passes to connector CN9 via pin 9 and connector CN11 via pin 9, respectively. A current from line SUB_POWER_CTRL passes through resistor R93 to NPN transistor Q3. Some current passing through NPN transistor Q3 passes to capacitor C50 and to relay safety switch K1. The current passing from capacitor C50 passes to relay safety switch K1. Current from capacitor C50 passes to connector CN9 via pin 9 and connector CN11 via pin 9, respectively. The current from connector relay safety switch K1 passes through CN11 via pin 1 and passes from pin 1 to connector CN9 at pin 1 and then to connector CN8 pin 1. Connector CN11, connector CN9 and connector CN8 are connected in series. A current received at pin 1 of connector CN8 passes to pin 9 of connector CN8. The current from relay safety switch K1 passes through connector CN11 pin 2 to connector CN9 pin 2 and then to connector CN8 pin 2. Some of the current passing through pin 2 of connector CN8 passes through resistor R83 and to NPN transistor Q1. The current passing from NPN transistor Q1 passes to resistor R78 and then to processor U7 along line ROST_OUT_SUB_Boards to RP5/RD15 pin 48. The current passing through resistor R83 passes to processor U7 along line ROST_in_SUB_Boards to RP143/RD14 pin 47. The current from relay safety switch K1 passes through connector CN11 pin 3 to connector CN9 pin 3 and then to connector CN8 pin 3. The current passing through pin 3 of connector CN8 passes through resistor R79 along line TX_SUB_Boards to RP15/RF8 of processor U7 via pin 53. The current from relay safety switch K1 passes through connector CN11 pin 4 to connector CN9 pin 4 and then to connector CN8 pin 4. The current passing through pin 7 of connector CN8 passes through resistor R80 along line RX_SUB_Boards to RP30/RF2 of processor U7 via pin 52. The current from relay safety switch K1 passes through connector CN11 pin 5 to connector CN9 pin 5 and then to connector CN8 pin 5. The current passing through pin 5 of connector CN8 passes along line PH1_SIC to interface board. The current from relay safety switch K1 passes through connector CN11 pin 6 to connector CN9 pin 6 and then to connector CN8 pin 6. The current passing through pin 6 of connector CN8 passes along line SUB_CLOCK to interface board. The current from relay safety switch K1 passes through connector CN11 pin 7 to connector CN9 pin 7 and then to connector CN8 pin 7. The current passing through pin 7 of connector CN8 passes along line SUB_RESET to interface board. The current from relay safety switch K1 passes through connector CN11 pin 8 to connector CN9 pin 8 and then to connector CN8 pin 8. The current passing through connector CN11 at pin 8 passes to pin 10 of connector CN11. The current passing through connector CN9 at pin 8 passes to pin 10 of connector CN9. Some of the current passing through connector CN8 at pin 8 passes to pin 10 of connector CN8 and to ground.

The Main Board. Connector CN19 and connector C21 communicate to daughter boards 1 and 2 (not shown) via line L3_main. Connector CN14 and connector CN18 communicate to daughter boards 3 and 4 (not shown) via line L2_main. Connector CN13, and connector CN17 communicate to daughter boards 3 and 4 (not shown) via line L1_main. A 12V power source passes some current to capacitor C52, resistor R94, MOV1 and to connector CN20 at pin 2, respectively. Some of the current passing through MOV1 passes to connector CN20 at pin 1 and to ground. The current passing through resistor R94 passes to capacitor C53 and to voltage regulator U11. The voltage passing through voltage regulator U11 passes to ground and to capacitor C56 respectively. A 5V power source provide a current hat passes to capacitor C56 and to voltage regulator U13. The current passing through voltage regulator U13 passes to capacitor C58. The current passing thorough capacitor C56 and capacitor C58 pass to connector CN20 at pin1. A 3.3V power source provides a current that passes to capacitor C58. Current from 3.3V_Main passes to capacitor C60, capacitor C61, capacitor C62, capacitor C63, capacitor C64, and capacitor C65, respectively. Capacitor C60, capacitor C61, capacitor C62, capacitor C63, capacitor C64, and capacitor C65 and connected in parallel and provide current to the system.

Figure 4A:
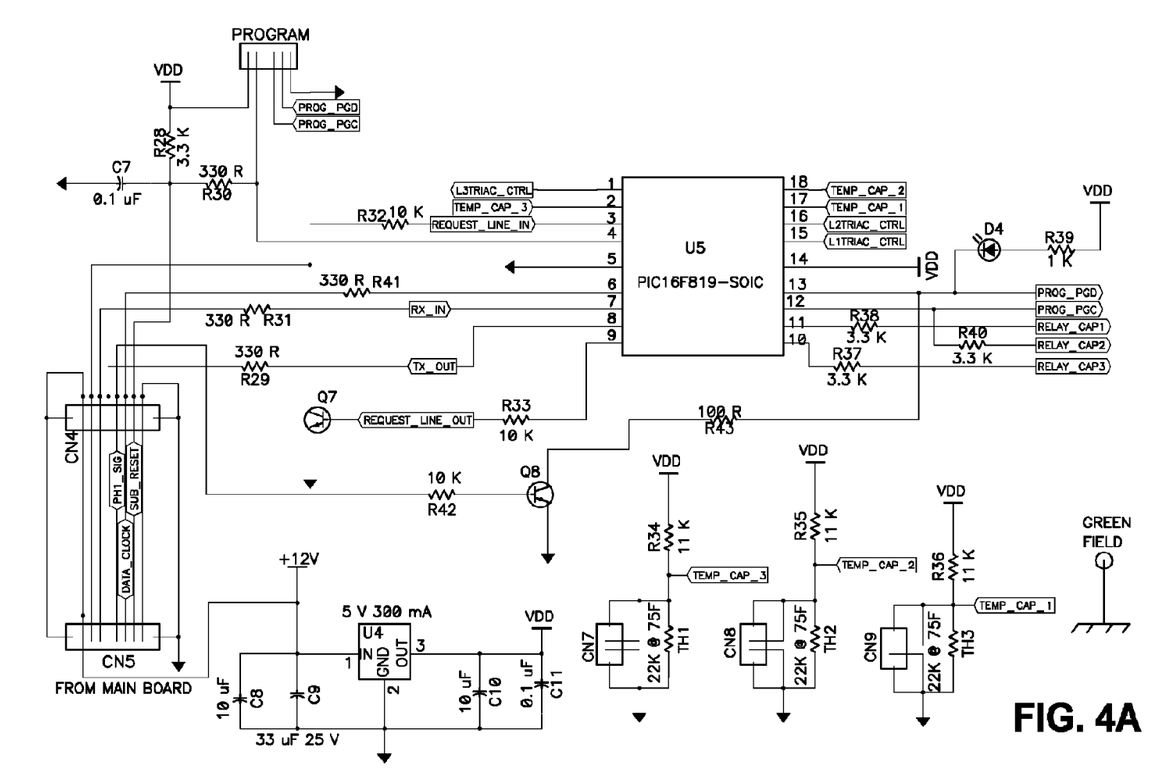
FIG. 4a is a schematic diagram of an exemplary control circuitry in an imbalance factor corrector.
Figure 4B:
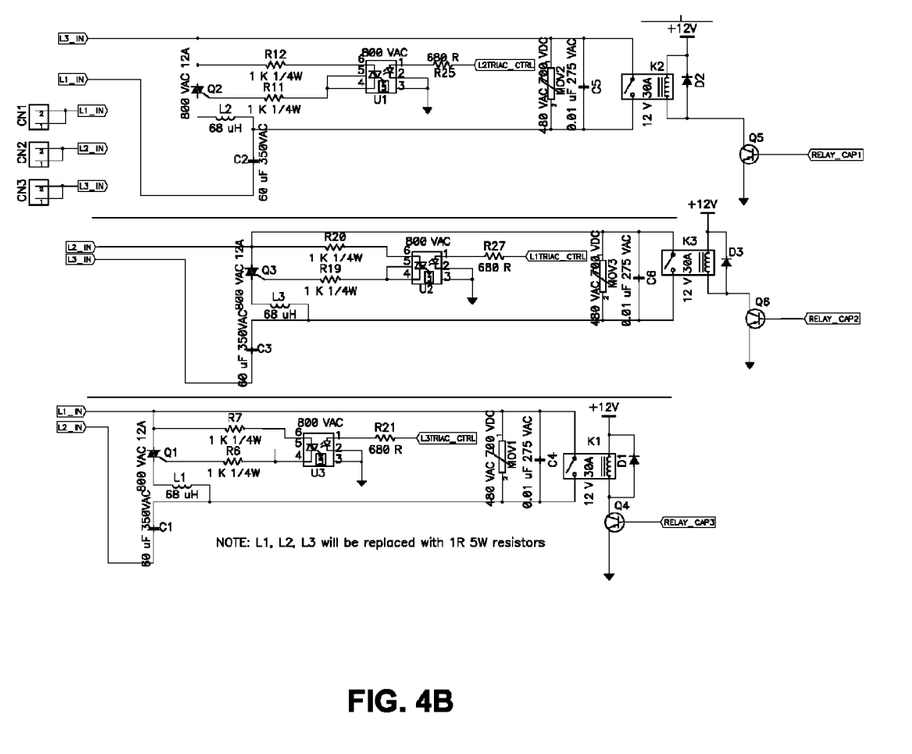
FIG. 4b is a schematic diagram of an exemplary control circuitry in an imbalance factor corrector.

FIGS. 4a and 4b are schematic diagrams of the interface board. The interface processing chip U4 receives and process all the information received from the main board and the daughter board. Processor U8 receives a charge of 3.3 volts to power its LED display readout at pin 8. Processor U8 possesses a read-only memory that retains its data when the power is turned off and that can be electronically erased and reprogrammed. Processor U8 receives a signal from Flash-hid at pin 7. Processor U8 receives a signal from flash_clk at pin 6. Processor Flash_CE receives a signal from pin 1. Processor U8 receives a signal from Flash_MSDI at pin 2. Processor U8 receives a signal from MSD0 at pin 5. Processor U8 receives a signal from Flash_WP at pin 3. Processor U8 releases a charge (VSS) at pin 4. Interface board contains two opto couplers, U2 and U3 respectively. An power source sends a 5 volt charge to opto coupler U3, opto coupler U2 and to capacitor C1, respectively. Capacitor C1 has a storage capacity able to draw off a portion of the charge provided by the 5 volt power source. Both opto couplers U3 and U2 redirect the incoming charge to capacitors C2 and C1 respectively. Capacitors C2 an C3 are designed to draw of a portion of the line charge to achieve a reduction of charge resulting in to auxiliary powers source each possessing 3.3 volt. In each redirection the resultant 3.3 volts passes to a power source provide an auxiliary power source. The voltage difference is redistributed throughout the dual opto coupler circuit. Opto coupler U3 is electrically connected to opto coupler U2 hence work in conjunction to achieve a reduction line charge. A 5 volt power source provides a bi-directional charge to interface Board link at pin and to diode D8. The charge exiting D8 proceeds to resistor R16. The exiting charge from diode D8 proceeds bi-directionally to diode D11 and to capacitor C26 Diode D14, and to power source B1, respectively. The charge at D11 proceeds to pin 2 of interface board link CN1.

Interface board link CN1 sends a signal from pin 3 bi-directionally to transistor Q4 and resistor R12 respectively. The charge exiting transistor Q4 proceeds to resistor R11. The charge exiting resister R11 proceeds to RJ5 of the interface processor U4. The charge exiting resistor R12 proceeds to RB0 of the interface processor U4. Interface board link sends a signal from pin 4 to resistor R13. The charge exiting resistor R13 proceeds to RC3 of the interface processor. Interface processor sends a signal from RC5 to resister R10. The exiting signal proceeds to pin 5 of the interface board link. Interface board link CN1 sends a signal from pin 6 to resistor R9. The exiting charge proceeds to RC4 of the interface processor U4. A 5v powers source provides a VCC charge to processor U5. Processor U5 receives a signal from RS232-TX at RI in Processor U5 sends a signal to interface processor U4 from RS232_RX. A 5 v power source provides a charge that proceeds bi-directionally to capacitor C24 and capacitor C23 respectively. The charge exiting capacitor C24 proceeds bi-directionally to resistor 24 and to capacitor C20 respectively. The charge exiting resistor R24 proceeds to RS232 COM 1. The charge exiting capacitor C20 proceeds to Processor U5. A 3.3 v power source proceeds a charge that proceeds bi-directionally to resistor R % and pin 1 of program respectively. The charge exiting resistor R5 proceeds bi-direction-ally to resistor R8 and capacitor C5, respectively. The charge exiting resistor R8 proceeds bi-directionally to pin 2 of program and MCLR of interface processor U5. Program sends and receives signal from the interface processor U5 via pin 3 of Program and RB7 of interface processor U5 respectively. Program sends and receives signal from the interface processor U5 via pin 4 of Program and RB8 of interface processor U4 respectively. A positive power sources at VDD 62, VDD 17, VDD 37, VDD 37, VDD 59, VDD 86, AVDD 30, and Envreg 39 provide a charge that proceeds to capacitors C10, C9, C7, and C6 respectively. A charge from program exits program at pin 5 and proceeds to capacitors C6, C7, C9, and C10 respectively. Interface processor U4 sends a positive power charge from VDDPLL 81, VDDTX 76, and VDDRX to capacitors C11 and C12 respectively. Display RS sends a signal to resistor R27. The exiting signal proceeds to the Interface processor U4 and said signal is received at RH3. Display RW sends a signal to resistor R28. The exiting signal proceeds to the Interface processor U4 and said signal is received at RE1. Display Enable sends a signal to resistor R29. The exiting signal proceeds to the Interface processor U4 and said signal is received at Reo. Interface Processor U4 sends a signal to Display 1 contrast from RC2 the signal exiting RC2 proceeds to resistor R30. The signal exiting R30 bi-directionally proceeds to capacitor C25 and Display1, respectively. Display1 07 sends a signal to resistor R32. The exiting signal proceeds to interface processor U4 and said signal is received at RF7. Display1 06 sends a signal to resistor. R33. The exiting signal proceeds to interface processor U4 and said signal is received at RF6. Display 05 sends a signal to resistor R34. The exiting signal proceeds to interface processor U4 and said signal is received at RF5. Display1 04 sends a signal to resistor R35. The exiting signal proceeds to interface processor U4 and said signal is received at RF4. Display1 03 sends a signal to resistor R36. The exiting signal proceeds to interface processor U4 and said signal is received at RF3. Display1 02 sends a signal to resistor R37. The exiting signal proceeds to interface processor U4 and said signal is received at RF2. Display1 01 sends a signal to resistor R38. The exiting signal proceeds to interface processor U4 and said signal is received at RF1. Display1 0o sends a signal to resistor R39. The exiting signal proceeds to interface processor U4 and said signal is received at RF0. Interface processor U4 receives a signal from SC Unit LED_x1 at RH1. Interface processor U4 receives a signal from. SC Unit LED_x0 at RH0. Interface processor U4 receives a signal from SC Unit LED_x6 at RE2. Interface processor U4 receives a signal from SC Unit LED_x7 at RE3. Interface processor U4 receives a signal from SC Unit LED_x8 at RE4. Interface processor U4 receives a signal from SC Unit LED_x9 at RE5. Interface processor U4 receives a signal from SC Unit LED_x10 at RE6. Interface processor U4 receives a signal from SC Unit LED_x11 at RE7. Interface processor U4 receives a signal from SC Unit LED_x2 at RD0. Interface processor U4 receives a signal from SC Unit LED_x3 at RD1. Interface processor U4 receives a signal from SC Unit LED_x4 at RD2. Interface processor U4 receives a signal from SC Unit LED_x5 at RD3. Interface processor U4 receives a signal from MSD0 at RD4. Interface processor U4 receives a signal from Flash MSD1 at RD5. Interface processor U4 receives a signal from Flash_CLK at RD6. Interface processor U4 receives a signal from Flash-Hold at RD7. Interface processor U4 receives a signal from SC Unit LED_y3 at RJ4. Interface processor U4 receives a signal from SC Unit LED_y2 at RJ3. Interface processor U4 receives a signal from SC Unit LED_y1 at RJ2. Interface processor U4 receives a signal from Flash_WP at RB5. Interface processor U4 receives a signal from Flash_CE at RB4. Interface processor U4 sends a signal that proceeds directly to resistor R14 RC6. The signal exiting resistor R14 proceeds to RS232 TX. RS232 sends a signal to resistor R15. The signal exiting resistor R15 proceeds to RC7 of the interface processor U4.

Figure 5A:
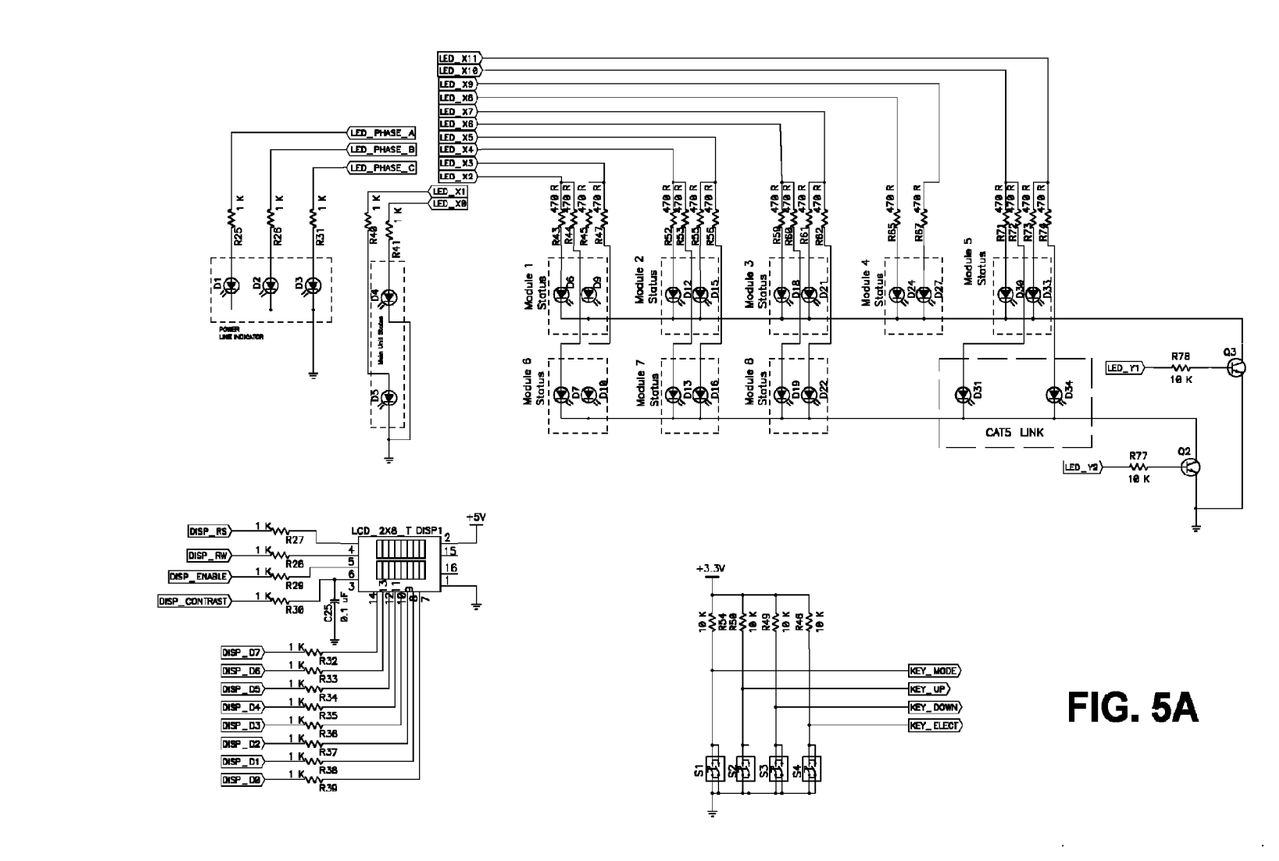
FIG. 5a is a schematic diagram of an exemplary control circuitry in an imbalance factor corrector.
Figure 5B:
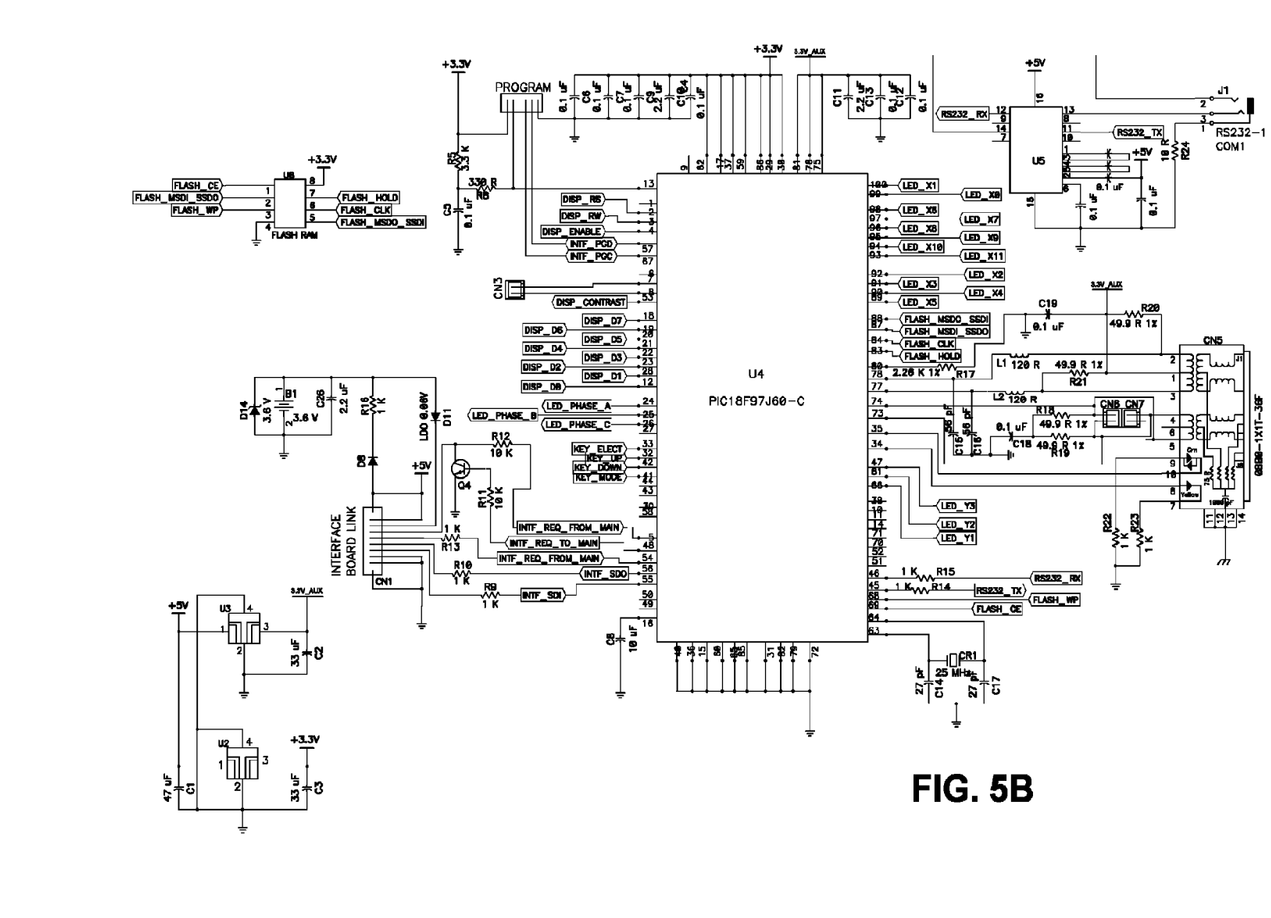
FIG. 5b is a schematic diagram of an exemplary control circuitry in an imbalance factor corrector.

FIGS. 5a and 5b show a schematic representation of daughter board 1 wherein L1 2, L2 3, and L3 4 convey a signal to said daughter board 1 from interfacing board 6 via connector 5. Display 7 shows a readout of time, date, current, voltage, power factor, power harmonics, imbalance, capacitance device to list several functions for illustration purposes only. Said display 7 is shows information from a menu (not shown) that is selected via manual selection using press buttons 12, 13, 14, and 15. Display 7 receives signals from said press buttons 12, 13, 14, and 15 respectively via 4 capacitor/resistors 8, 9, 10, and 11 respectively. Said capacitor/resistors 8, 9, 10, and 11 and connected to and receive signal from 4 press buttons 12, 13, 14, and 15 respectively. LED array 16 is configured to indicate 8 individual indicators 17, 18, 19, 20, 21, 22, 23, 24, and 25 respectively. Said indicators 17, 18, 19, 20, 21, 22, 23, 24, and 25 are connected so that when capacitance is applied on any particular daughter board a corresponding pair of indicators will emit a light. An IP LED detector 26 is connected to the daughter board 1 and emits a light when capacitance is applied. Sender link Led 27 is connected to daughter board 1 and said Sender link Led emits a light when a signal is being sent from said daughter board 1 in the event capacitance is being applied. Status Led 28 is connected to daughter board 1 and flashes in the event a signal is being received. Link LED 29 is connected to said daughter board 1 and emits a flashing light when a link to an outside data collection unit has been established. Interface processor 9 receives signals from and sends signals to main board 30 via the interface board 31. 232 port 32 is connected to the daughter board 1 and allows communication to the system for calibration, upgrades to illustrate two of many functions only. CatV 34 is connected to daughter board 1 and allows communication with the facility as well as to other units. Said communication may include but is not limited to relationship designation, energy demands to list two options for illustration purposes only. Battery 35 is an internal energy source that protects the integrity of the unit in the event of a power outage and maintains date and time to list two functions for the purpose of illustration only.

I claim:

1. An apparatus for dynamically correcting load imbalance in a three-phase electrical system, the three-phase electrical system having three supply leads and a neutral lead, there being supply voltages present between adjacent supply leads and supply currents on each of the supply leads; there existing a phase relationship between each supply voltage and each supply current, the apparatus comprising:
   a sensor adapted to sense current on the neutral lead;
   phase controllers connected between each pair of adjacent supply leads adapted to control the phase relationship between voltage between the supply leads and current on the supply leads, the phase controllers able to push the phase relationship into a lead or lag phase relationship;
   a processor executing a stored program adapted to read the sensor and determine current on the neutral lead;
   the processor connected to, and controlling, the phase controllers in order to push some of the phase controllers into a lead phase relationship;
   the processor adjusting the lead relationship on some of the supply leads to cause the neutral current to go to zero.

2. The apparatus of claim 1 wherein the phase controllers contain banks of capacitors.

3. The apparatus of claim 2 wherein some of the capacitors are dynamically switched in and out of service.

4. The apparatus of claim 3 wherein the capacitors are switched in and out of service at a point along the AC waveform between 90 degrees and 180 degrees in time.

5. The apparatus of claim 1 wherein the processor is a micro-controller.

6. An apparatus for dynamically correcting load imbalance in a three-phase electrical system, the three-phase electrical system having three supply leads and a neutral lead, there being supply voltages present between adjacent supply leads and supply currents on each of the supply leads; there existing a phase relationship between each supply voltage and each supply current, the apparatus comprising:
   a sensor adapted to sense current on the neutral lead;
   phase controllers connected between each pair of adjacent supply leads adapted to control the phase relationship between voltage between the supply leads and current on the supply leads, the phase controllers able to push the phase relationship into a lead or lag phase relationship;
   a processor executing a stored program adapted to read the sensor and determine current on the neutral lead;
   the processor connected to, and controlling, the phase controllers in change the phase relationship between supply lead voltage and current on each pair of supply leads;
   the processor adjusting the phase relationship on some of the supply leads to cause the neutral current to go to zero.

7. The apparatus of claim 6 wherein the phase controllers contain banks of capacitors.

8. The apparatus of claim 7 wherein some of the capacitors are dynamically switched in and out of service.

9. The apparatus of claim 8 wherein the capacitors are switched in and out of service at a point along the AC waveform between 90 degrees and 180 degrees in time.

10. The apparatus of claim 6 wherein the processor is a micro-controller.

* * * * *